April 3, 1956 S. B. RIGGS 2,740,228
BOLL WEEVIL BURNER
Filed Aug. 7, 1953 3 Sheets-Sheet 2
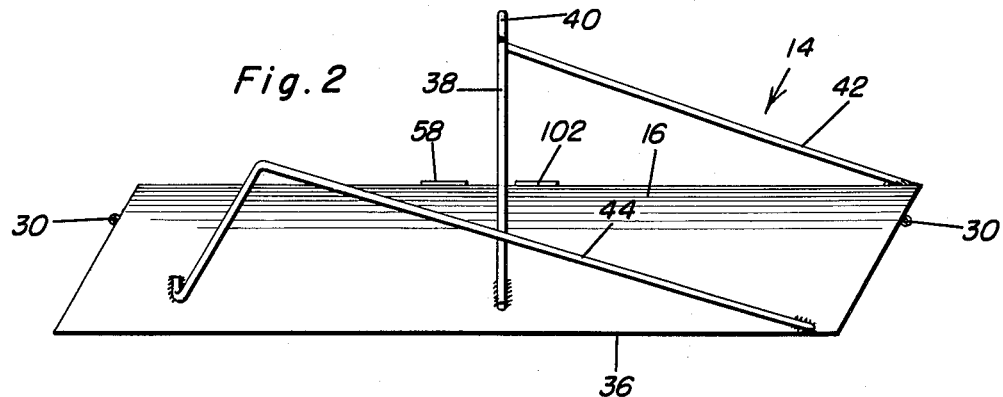
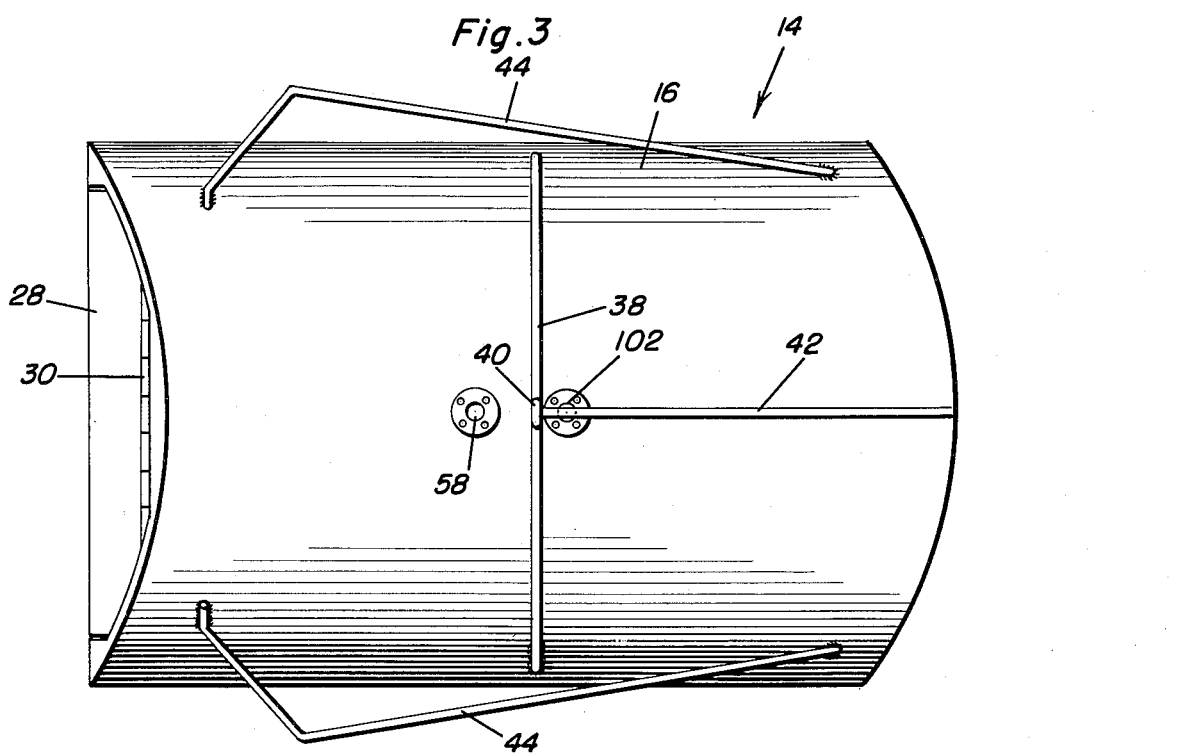
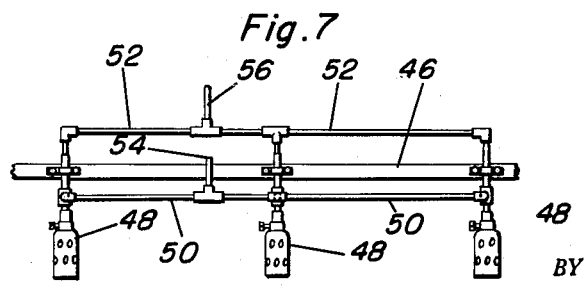
Simon B. Riggs
INVENTOR.
BY Clarence A. O'Brien
and Harvey B. Jackson
Attorneys

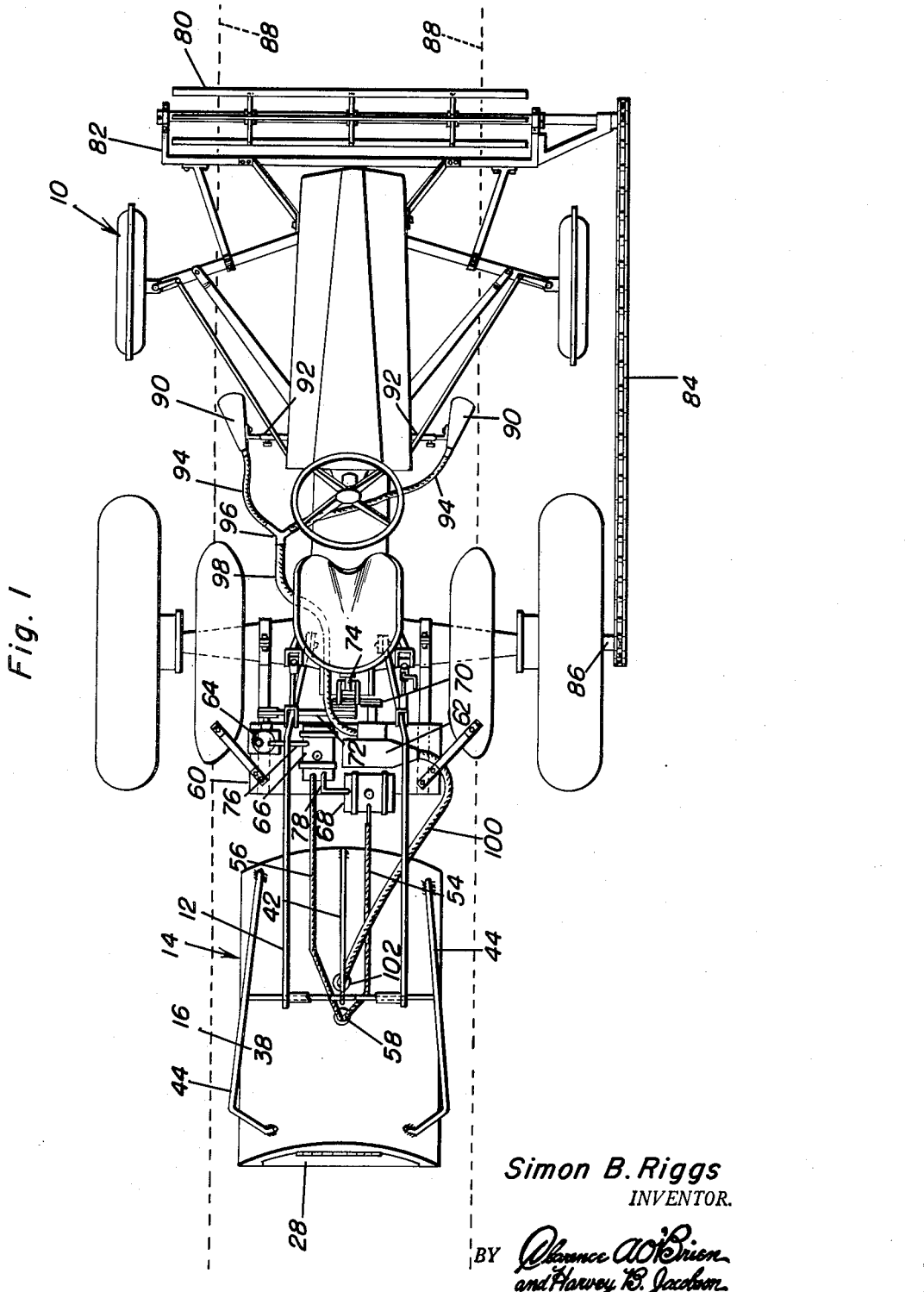

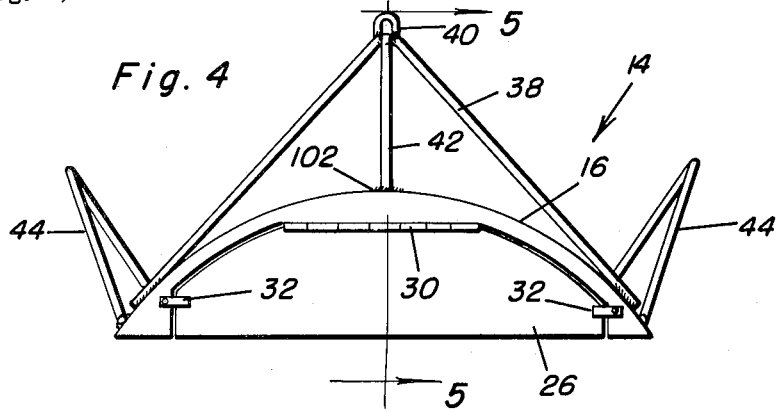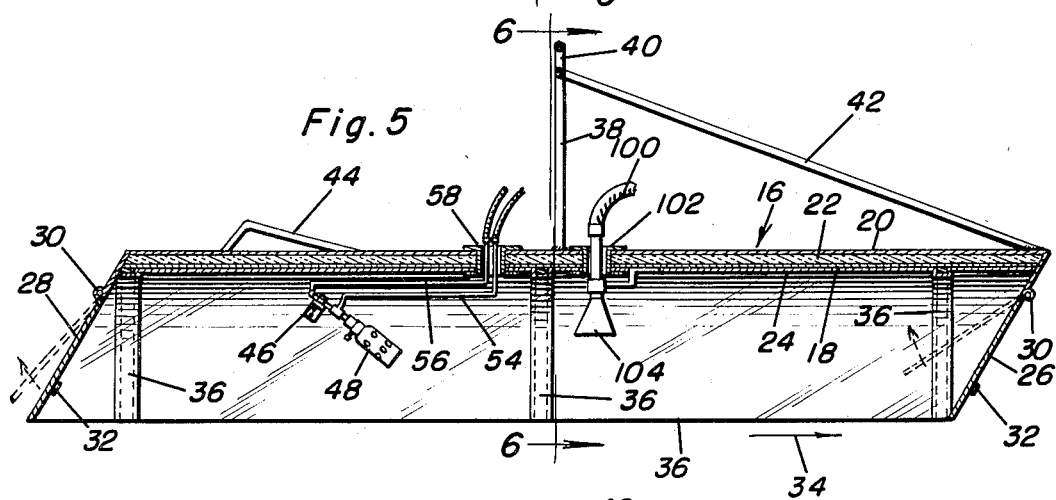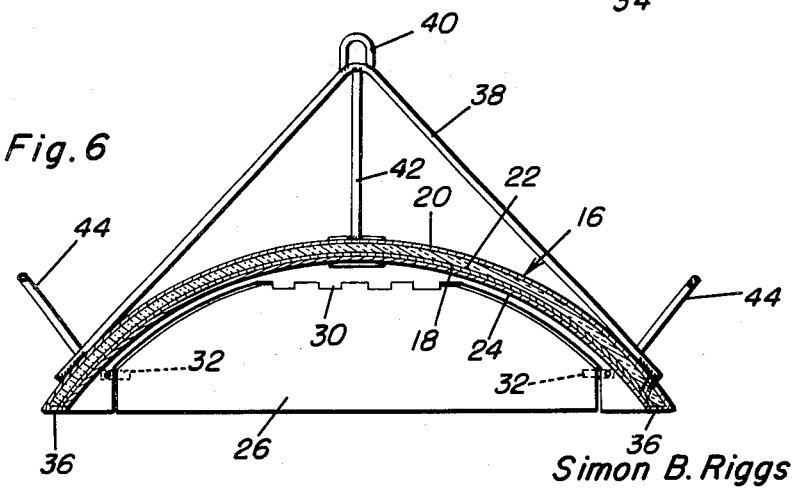

United States Patent Office 2,740,228
Patented Apr. 3, 1956

2,740,228
BOLL WEEVIL BURNER

Simon B. Riggs, Jonesboro, Ark., assignor of one-third to Walter F. Simpkins and one-third to Anna J. Ragsdale, both of Jonesboro, Ark.

Application August 7, 1953, Serial No. 372,933

3 Claims. (Cl. 43—144)

This invention relates to new and useful improvements and structural refinements in boll weevil burners, and the principal object of the invention is to provide an apparatus of the character herein described, which is primarily intended for the cultivation of cotton and similar plants, and which embodies in its construction flame throwing means for burning and thereby exterminating boll weevils or other insects as well as portions of the plants affected thereby.

An important feature of the invention resides in the provision of means for effectively destroying insects as well as certain affected portions of the plants, while carefully preserving the healthy portions of the plants against damage by heat or physical injury resulting from the operation of the cultivator.

With the above more important objects and features in view and such other objects and features as may become apparent as this specification proceeds, the invention resides in the details of construction and operation as more fully hereinafter described and claimed, reference being had to the accompanying drawings forming a part hereof, wherein:

Figure 1 is a top plan view of the invention including a conventional tractor on which the invention is mounted and by which it is carried;

Figure 2 is a side elevational view of the burner unit per se;

Figure 3 is a top plan view of the burner unit;

Figure 4 is a front end view of the burner unit;

Figure 5 is a longitudinal sectional view, taken substantially on the plane of the line 5—5 in Figure 4;

Figure 6 is a transverse sectional view, taken substantially in the plane of the line 6—6 in Figure 5; and Figure 7 is a fragmentary elevational view illustrating the arrangement of the burner nozzles used in the burner unit.

Like characters of reference are employed to designate like parts in the specification and throughout the several views.

Referring now to the accompanying drawings in detail, more particularly Figure 1, the invention is mounted on and carried by a conventional tractor, which is designated generally by the reference character 10 and is provided at the rear end thereof with a conventional lift mechanism 12.

A burner unit designated generally by the reference character 14 and hereinafter more particularly described is carried by the lift mechanism 12. This burner unit comprises a housing 16 which is open at the bottom thereof and assumes the form of a continuous, transversely arcuate side and top wall, as is best shown in Figure 6.

This housing is preferably fabricated from inner and outer wall members 18, 20 having a layer of insulating material 22 disposed therebetween, and the inner wall member 18 is provided and the inside surface thereof with a layer or coating of reflective material 24 so as to direct the heat toward the ground.

The housing 16 is provided at the respective front and rear ends thereof with rearwardly swingable front and rear doors 26, 28 which are swingably attached to the housing by suitable hinges 30 and are normally urged to their closed position by the effect of gravity, so that they engage suitable abutments or stops 32 with which the front and rear ends of the housing are equipped.

It will be understood from the foregoing that when the burner unit 14 is drawn along the ground by the tractor 10 in the direction of the arrow 34 in Figure 5, the doors 26, 28 will be automatically opened when the burner unit passes over obstructions such as stones, or the like.

The housing 16 is provided at the inside thereof with a plurality of transversely extending arcuate reinforcing ribs 36 and it will be also understood that when the housing is dragged along the ground by the tractor 10, the lower edges 38 of the housing will effectively function in the nature of skids.

The housing 16 is provided at the top thereof and intermediate its ends with an inverted V-shaped suspension member 38 which is formed at the apex thereof with a loop 40 for attachment of the entire burner unit 14 to the lift mechanism 12 of the tractor 10. The suspension member 38 is reinforced to the housing 16 by a downwardly and forwardly extending brace 42 as shown.

It will be also observed that a pair of angulated, upwardly and laterally extending guards 44 are secured to the housing 16 at the opposite sides of the housing, these guards projecting laterally beyond the lower edges 36 of the housing and being so arranged that when the burner unit is drawn along the ground between two adjacent rows of plants, the guards 44, coacting with the curved configuration of the housing 16 will effectively prevent the housing from damaging the plants in the rows.

A transversely extending support member 46 is provided in the housing 16 intermediate the ends thereof and has mounted thereon a plurality of downwardly and forwardly directed burner nozzles 48. These nozzles are more-or-less of a conventional construction and are connected to conduits 50 delivering fuel under pressure, as well as to conduits 52 delivering compressed air. The conduits 50 communicate with a flexible fuel hose 54 while the compressed air conduits 52 communicate with a flexible compressed air hose 56, and the two hoses 54, 56 extend outwardly from the housing 16 through a grommet 58 with which the housing is equipped, as is best shown in Figure 5.

Referring again to the accompanying Figure 1, it will be observed that the aforementioned tractor 10 is provided at the rear end thereof with a stationary platform 60 on which is mounted an air blower 62, an air compressor 64, a compressed air tank 66, and a fuel tank 68.

The air blower 62 and the air compressor 64 are driven by suitable belting 70, 72, respectively, from the customary power take-off 74 of the tractor 10 and a line 76 extends from the air compressor 64 to the compressed air tank 66.

The aforementioned compressed air hose 56, extending from the burner unit 14, communicates with the compressed air tank 66, while the aforementioned fuel hose 54 communicates with the fuel tank 68. Moreover, a line 78 extends from the compressed air tank 66 to the fuel tank 68, as shown.

It will be understood from the foregoing that when the apparatus is in operation, the air compressor 64 will maintain a supply of compressed air in the tank 66, from which air under pressure will pass through the hose 56 and conduit 52 to the burner nozzles 48 while, at the same time, compressed air reaching the fuel tank 68 from the air tank 66 through the line 78 will deliver fuel under pressure through the hose 54 and conduits 50 to the burner nozzles 48.

With continued reference to the accompanying Figure 1, it will be observed that a transversely extending, rotary reel 80 is mounted in a suitable frame 82 at the front of the tractor 10 and is preferably driven by a chain drive 84 from the rear axle 86 of the tractor. The purpose of this rotating reel is to agitate the plants in the adjacent rows (indicated at 88), so as to knock off therefrom any insects such as boll weevils, or the like, as well as portions of the plants damaged thereby. These insects damaged plant portions fall to the ground between the adjacent rows 88 of the plants so that when the burner unit 14 travels thereover, the insects and damaged plant portions will be effectively destroyed.

In addition, means are provided for picking up insects and damaged plant portions such as may fall directly to the bottom of the plants, these means consisting of a pair of suction nozzles 90 which are attached by adjustable brackets 92 to the tractor 10 rearwardly of the reel 80, but forwardly of the burner unit 14. It is to be noted that the nozzles 90 are spaced laterally or outwardly from the sides of the burner unit, so that they may effectively pick up any insects or damaged plant portions from the base of the plants.

The suction nozzles 90 are connected by flexible ducts 94 to a Y-coupling 96 which, in turn, is connected by a flexible duct 98 to the intake of the aforementioned air blower 62. The exhaust of this air blower communicates with a flexible duct 100 which extends through a grommet 102 in the housing 16 of the burner unit 14 and is provided within the burner unit with an outlet spout 104.

In this burner, any material picked up by the suction nozzles 90 will be delivered by the air blower 62 to the interior of the burner unit 14 and effectively destroyed.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. The combination of a tractor provided with a lift mechanism at the rear end thereof, a burner unit carried by said lift mechanism, a rotary reel carried by and extending transversely of said tractor, means for rotating said reel, a plurality of suction nozzles attached to the tractor rearwardly of said reel and laterally of said burner unit, and means for delivering material collected by said nozzles into the burner unit.

2. The combination of a tractor provided with a lift mechanism at the rear end thereof and also provided with a power take-off, a rotary reel carried by and extending transversely of the front end of said tractor, means for rotating said reel, an air blower carried by the tractor and driven by the power take-off thereof, a burner unit carried at the rear end of the tractor and having a transversely arcuate housing with rearwardly pivoted front and rear doors and an open bottom, a plurality of suction nozzles attached to the tractor rearwardly of said reel and laterally of said burner unit, ducts connecting said nozzles to said blower, and a duct extending from the blower into said burner unit for discharging into the latter material collected by said nozles.

3. The combination as defined in claim 2 wherein said burner unit includes a plurality of burner nozzles, together with an air compressor and a fuel pump driven by said power take-off, and means for delivering air and fuel under pressure from said aid compressor and said fuel pump respectively to said burner nozzles.

References Cited in the file of this patent

UNITED STATES PATENTS

| | | |
|---|---|---|
| 610,612 | Setter | Sept. 13, 1898 |
| 649,870 | Jones | Oct. 16, 1900 |
| 954,629 | Hebert | Apr. 12, 1910 |
| 1,081,035 | Geyer | Dec. 9, 1913 |
| 1,255,131 | Cameron | Feb. 5, 1918 |
| 1,433,885 | Fuller | Oct. 31, 1922 |
| 1,436,958 | Hebert | Nov. 28, 1922 |
| 1,458,070 | Long et al. | June 5, 1923 |
| 1,623,221 | Weimer | Apr. 5, 1927 |
| 1,904,832 | Knapp et al. | Apr. 18, 1933 |
| 2,273,254 | Davis | Feb. 17, 1942 |
| 2,424,468 | Keathley | July 22, 1947 |
| 2,494,175 | Hoder | Jan. 10, 1950 |